United States Patent [19]
Boulanger

[11] 3,969,585
[45] July 13, 1976

[54] FREQUENCY-DIVISION MULTIPLEXER FOR TELEPHONE TRANSMISSION PROVIDING FOR TRANSPOSITION OF CONVERSATION AND CALLING CHANNELS INTO A PRIMARY FREQUENCY GROUP

[75] Inventor: Claude Boulanger, Chevilly-Larue, France

[73] Assignee: Compagnie Industrielle des Telecommunications Cit-Alcatel, France

[22] Filed: Aug. 16, 1974

[21] Appl. No.: 498,116

[30] Foreign Application Priority Data
Aug. 16, 1973 France .............................. 73.29880
June 12, 1974 France .............................. 74.20360

[52] U.S. Cl. ............................................ 179/15 FD
[51] Int. Cl.² ............................................ H04J 1/06
[58] Field of Search .......... 179/15 FD, 15 FS, 15 BY

[56] References Cited
UNITED STATES PATENTS
3,495,188   2/1970   Kopp ............................... 179/15 FS

*Primary Examiner*—Kathleen H. Claffy
*Assistant Examiner*—E. Matt Kemeny
*Attorney, Agent, or Firm*—Craig & Antonelli

[57] ABSTRACT

Multiplexer for telephone transmission coupling the calling channels containing supervisory information which are not premodulated to the premodulated conversation channels which contain the voice information, modulating the coupled channels to bring the conversation signals into the multiplex group and using a single extra modulation of the whole spectrum obtained after modulation of the coupled channels to re-position correctly the calling signals in the multiplex group.

6 Claims, 5 Drawing Figures

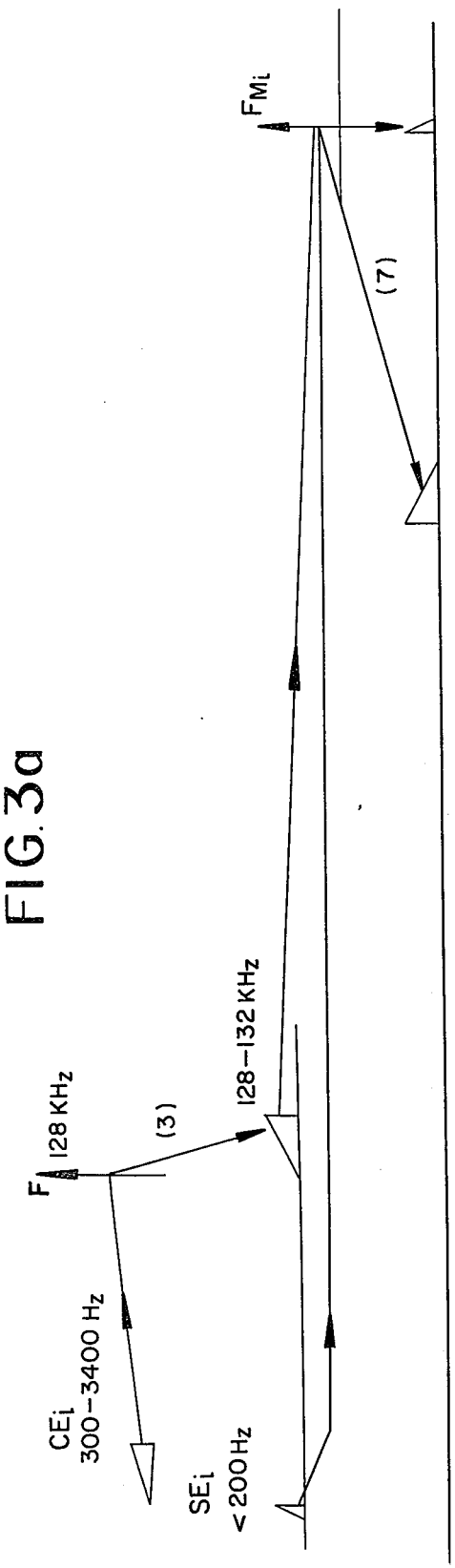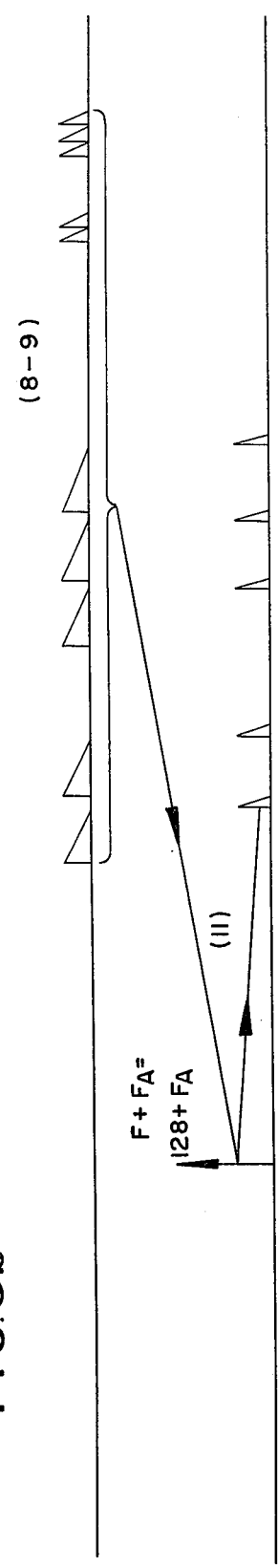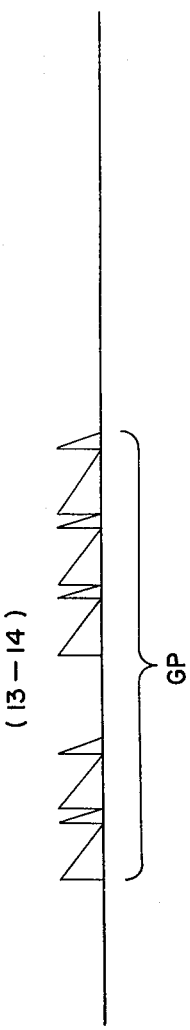

FREQUENCY-DIVISION MULTIPLEXER FOR TELEPHONE TRANSMISSION PROVIDING FOR TRANSPOSITION OF CONVERSATION AND CALLING CHANNELS INTO A PRIMARY FREQUENCY GROUP

The present invention relates to transmission of telephone signals. It concerns more particularly the modulation of telephone signals for the constituting of a multiplex frequency group, for example a basic primary group having a band of 60 – 108 kc/s or a high-frequency primary group having a band of 1104 – 1152 kc/s with twelve channels.

In known devices, the constituting of a primary group, based on twelve channels for low-frequency conversation signals, is provided for by a first modulation, called premodulation, of the voice-frequency channels by a carrier having the same frequency F for all the channels, for example 128 kc/s, and by a second modulation with carriers spaced out in 4 kc/s increments, so as to place the premodulation channels in the band of the primary group. The second modulation carriers are comprised between 192 and 236 kc/s or 1232 and 1280 kc/s to place the channels in the 60 – 108 kc/s or 1104 to 1152 kc/s band of the basic primary group or the high-frequency primary group. The advantage of such a device resides essentially in the filtering of the signals of the premodulation channels: the channel filters being identical from one channel to another.

Nevertheless, at the time when the primary group is constituted, it is necessary to combine, in the band of the primary group, the signals of the calling channels containing the supervisory information of the telephone signals which each correspond to a conversation channel containing the voice information of the telephone signals. It is a known method to effect the transposition of the call signals, constituted by signals having a very low frequency of less than 200 c/s, to a frequency FA, for example, of 0 or 3.825 kc/s given in relation to the voice-frequency channels in the multiplex group, by a modulation in the emitting of the call signals with a carrier whose frequency is 128 or 131.825 kc/s followed by a filtering to place the call signals in the premodulation band of the conversation signals. For reverse transposition, on the receiving side, an analogous device is adopted for reconstituting the premodulation channels, whereas from each premodulation channel reconstituted, a modulation with a carrier of 128 kc/s followed by a filtering enables the reconstituting of each of the twelve conversation signal channels.

The present invention aims at reducing the work of that device for multiplexing telephone channels on the transmission side of the signals. Its aim is to provide a device which makes it possible to conciliate the advantages of the premodulation inasmuch as concerns the conversation channels and of direct modulation which would transpose the call signals into the band of the frequency multiplex group inasmuch as concerns the calling channels.

The object of the present invention is a multiplexer for telephone channels providing for the transposition of conversation channels and of calling channels respectively, connected together in the band of a multiplex frequency group, in which the transposition of each of the conversation channels is provided for by a premodulation by a first carrier having the same frequency to constitute premodulation channels, followed by a modulation by a second carrier, placing the conversation channels in the band of the multiplex group, from one channel to the other, the frequencies of the second carriers being shifted every 4 kc/s according to the order of the channel, characterized in that the transposition of the calling channels is provided for by direct coupling of the calling channels to the premodulation channels of the conversation signals and by simultaneous modulation with the premodulated conversation signals by the second respective carriers, spaced out in 4 kc/s increments, followed by modulation by a third carrier in a single modulator of the spectrum as a whole, formed by the conversation channels and calling channels modulated by the second respective carriers, and filtering of the spectrum obtained before and after modulation by the said third carrier in a single bandpass filter corresponding to the band of the multiplex group of the assembly.

Other characteristics and the advantages of the present invention will become apparent from the following description of an embodiment illustrated, given with reference to the accompanying drawing, in which:

FIGS. 3a, 3b and 3c show respective representations of the scheme of operation of the device according to FIG. 1.

Figure 1:
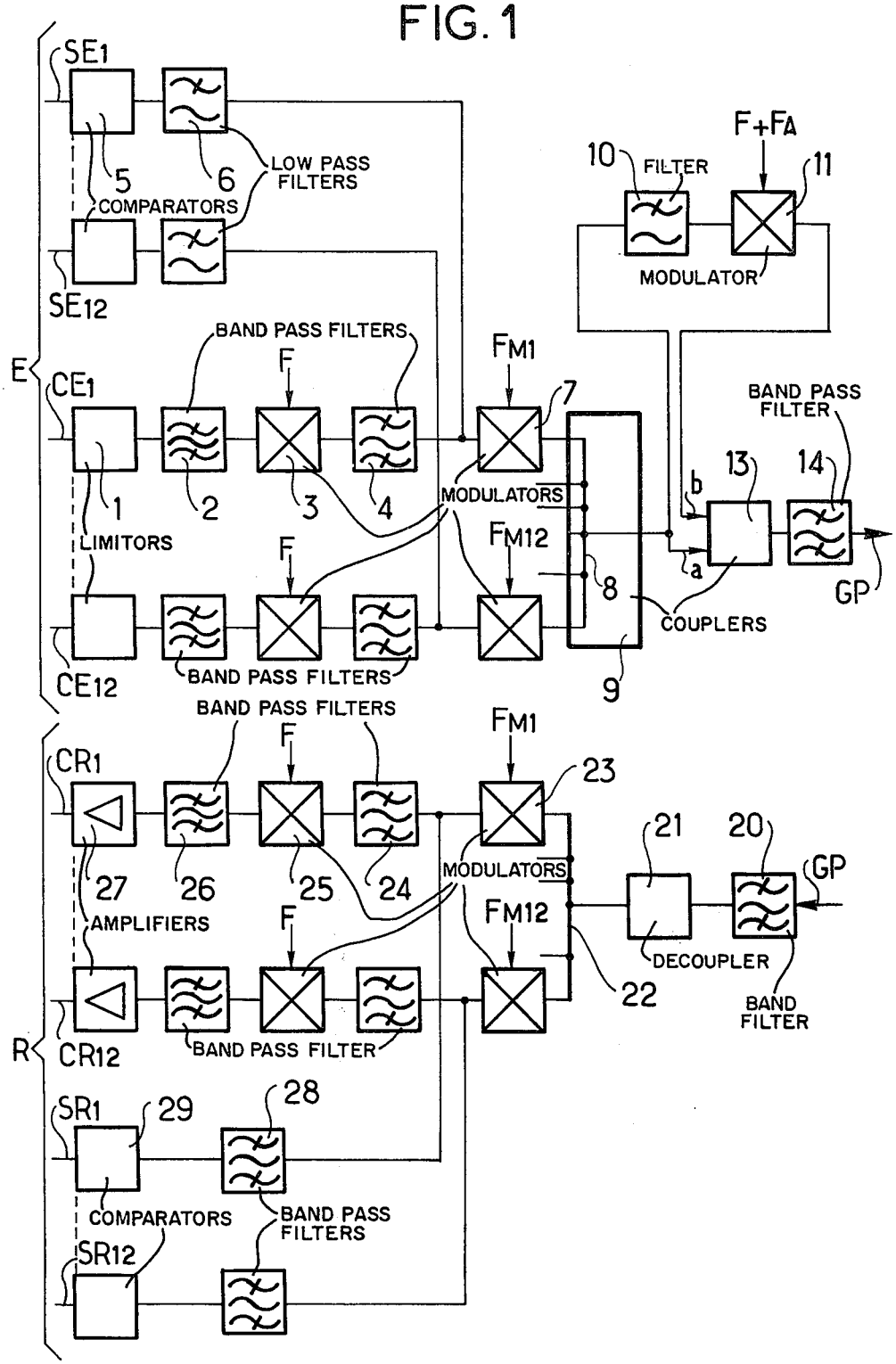
FIGS. 1 and 2 show two embodiments of the device according to the invention.

FIG. 1 shows an emitting device E enabling the constituting of a primary group GP for telephone channels, grouping together in the band of the primary group, the voice-frequency signals of twelve conversation channels CE1 to CE12 and the calling signals SE1 to SE12 of the calling channels respectively corresponding thereto. A receiving device R, of known type, enabling the reconstituting of the conversation channels CR1 to CR12 and of the calling channels SR1 to SR12, based on the primary group GP, has also been shown therein.

In the emitting device, the conversation signals, for each of the channels CE1 to CE12 after the limiting of the level and the limiting of the low-frequency spectrum, by a limiter 1 followed by a 300 – 3400 c/s bandpass filter 2, are placed in the 128 – 132 kc/s premodulation band by modulation in a first modulator 3 by a 128 kc/s carrier F followed by a 128 – 132 kc/s bandpass filter 4.

Each of the calling channels SE1 to SE12, after a detection of level in a threshold comparator such as 5 and limiting of the spectrum of the calling pulses in a low-pass filter having a pass-band of less than 200 c/s, such as 6, is directly coupled to the premodulation channel of the conversation signals corresponding to it. Thus, the channel SE1 is coupled to the premodulated channel CE1; the channel SE2 is coupled to the premodulated channel CE2 . . . and the channel SE12 is coupled to the premodulated channel CE12. The premodulation band of the conversation channels, for example 128 – 132 kc/s and the low-frequency spectrum of the calling signals (<200 c/s) are retrieved on the premodulation channels.

The premodulated conversation signal and calling signal taken as a whole, on each premodulation channel, is modulated in a second modulator, such as 7, by a carrier whose frequency is a function of the order of the channel, that is, the carriers FM1 to FM12 for the twelve channels shifted in 4 kc/s increments. A coupler 8, 9 connects together the twelve modulation channels. The modulated spectrum as a whole, which may be eliminated of undesirable modulation products in a filter 10, is then modulated by a carrier whose frequency is F + FA, in a single modulator 11 in order to place the calling signals in the band of the transposed frequency conversation signals. A coupler 13 receives the spectrum as a whole coming from the channel coupler 8, 9 on a first input a and, after modulation at 11, on a second input b. The coupler 13 applies the spectrum to a band-pass filter 14 having a width equal to the band of the primary group GP. Thus, a multiplex frequency group in which the conversation signals and the calling signals are grouped together is constituted.

The digital values of the carrier frequencies given hereinabove by way of an example will make it easier to understand the operation of that emitting device for the constituting of a basic primary group or of a high-frequency primary group. For instance, by reference to FIG. 3a, the voice frequencies on the filtered channels CE1 to CE12 (or $CE_i$ for a single channel in FIG. 3a) are comprised in the 300 – 3400 c/s band. The premodulation frequency of the modulator 3 is F = 128 kc/s; the premodulation channels are all in the same 128 – 132 kc/s band. The calling signals $SE_i$ are at a very low frequency, lower than 200 c/s after filtering. The calling frequency Fa of the calling signals in the multiplex group may be 0 or 3.825 kc/s, and in the representations of FIGS. 3($a$–$c$) is 0. That frequency FA is given in relation to each of the conversation channels to which the calling signals correspond respectively, and defines the position of the respective calling signals in relation to each voice channel in the multiplex group. At the time of the coupling of the calling channels SE1 to SE12 respectively to the premodulated channels CE1 to CE12, the calling signals are shifted by F + FA in relation to their normal position in the premodulated conversation channels.

the second modulation frequencies FM1 to FM12 of the modulators 7 (or $FM_i$ in the single channel representation of FIG. 3a) are chosen in the 192 – 236 kc/s band or 1232 – 1280 kc/s band to constitute a 60 – 108 kc/s basic primary group or an 1104 – 1152 kc/s high-frequency primary group. That second modulation transposes the premodulated conversation channels in the band of the primary group GP and the calling channels in the FM1 to FM12 band. These calling channels thus modulated are outside the band of the primary group GP, as shown in FIG. 3b showing the coupling of the twelve conversation and calling channels. The third modulation frequency of the modulator 11 of the spectrum as a whole coming from the coupler 8, 9 in FIG. 3b is 128 kc/s + FA. That extra modulation of the spectrum as a whole has the effect of replacing the calling signals in their normal position with respect to the conversation signals in the primary group GP, as shown in FIG. 3c. The spectrum as a whole is limited by a band-pass filter 14.

FIG. 1 also shows the device R providing for the reverse transposition; that device being of a known type.

The multiplex group GP, after filtering of the band of the group GP at 20, is divided up into twelve channels by a decoupling element 21, 22. A first modulation occurs by one of the carriers having a frequency of FM1 to FM12, in a modulator such as 23, followed by a filtering in a band-pass filter such as 24 having a width of 128 –132 kc/s, each restoring one of the premodulated conversation channels. That first modulation by FM1 to FM12, followed by a filtering in a band-pass filter such as 28 centered on 128 + FA, restores each of the calling channels. For each of the premodulated conversation channels, a modulation by a carrier whose frequency is F = 128 kc/s in a modulator 25, followed by a filtering in a band-pass filter such as 26 and an amplification at 27, restores each of the conversation channels CR1 to CR12.

For each of the premodulated calling channels coming from filters such as 28, a level detection in a fixed threshold comparator, such as 29, makes it possible to restore or reconstitute the calling signals of the calling channels SR1 to SR12.

Figure 2:
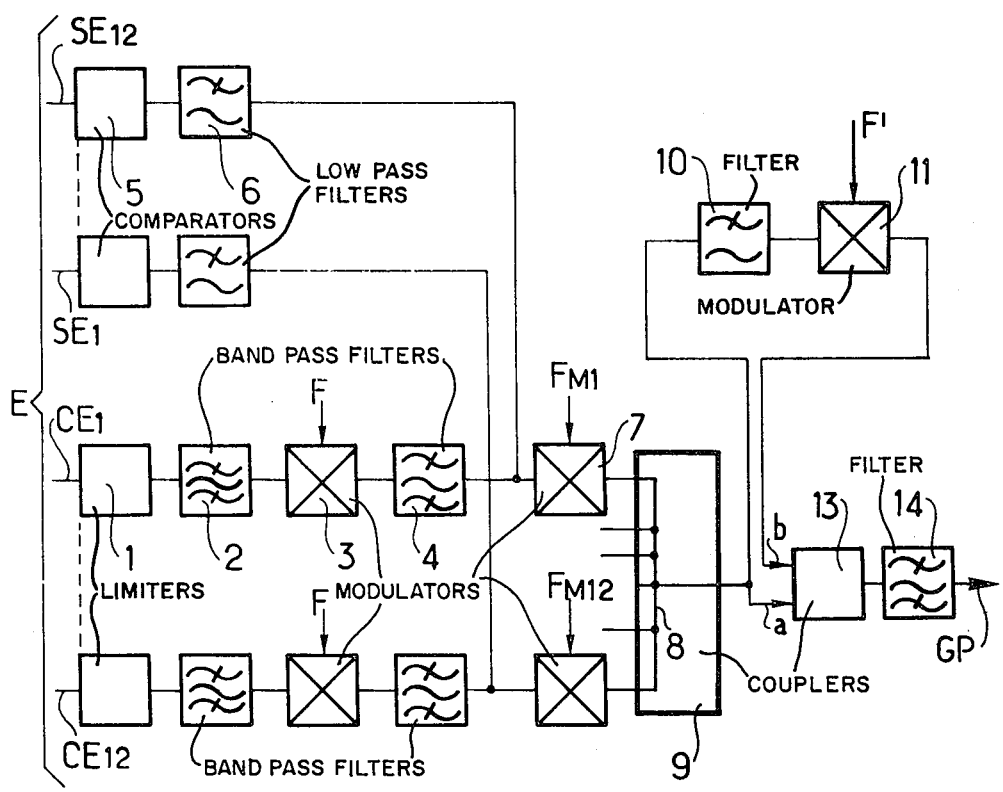

FIG. 2 shows simply an emitting device according to a variant of that in FIG. 1. In FIG. 2, elements identical to those in FIG. 1 are designated by the same reference numeral.

For each of the conversation channels CE1 to CE12, the conversation signals, after limiting the level and limiting the low-frequency spectrum by a limiter 1 followed by a 300 – 3400 c/s band-pass filter 2, are placed in the 128 – 132 kc/s premodulation band by modulation in a first modulator 3 by a 128 kc/s carrier F followed by a 128 – 132 kc/s band-pass filter 4. The calling channels SE1 to SE12 taken in increasing orders, after level detection in a threshold comparator, such as 5, and a limiting of the spectrum of the calling pulses in a low-pass filter, such as 6, having a pass-band of less than 200 c/s for each calling channel, are directly coupled respectively to the premodulation channels of the conversation signals taken in decreasing order. Thus the channel SE1 is coupled to the premodulated channel CE12; the channel SE2 is coupled to the premodulated channel CE11, . . . and the channel SE12 is coupled to the premodulated channel CE1. The premodulation band of the conversation channels, for example 128 – 132 kc/s and the low-frequency spectrum, less than 200 c/s, of the calling signals, are recovered on the premodulation channels. The calling signals do not correspond to the premodulated conversation signals with which they are respectively connected on the premodulation channels.

The premodulated conversation signal and the calling signal taken as a whole on each premodulation channel is modulated in a second modulator such as 7 by a carrier whose frequency is a function of the order of the channel, that is, the carriers FM1 to FM12 for the twelve channels shifted in 4 kc/s increments.

A coupler 8, 9 connects together the twelve modulation channels. The modulated spectrum as a whole, which may be eliminated of undesirable modulation products in a filter 10 is then modulated by a carrier, whose frequency is F', in a single modulator 11, in order to place the calling signals in the band of the conversation signals whose frequency is transposed. The frequency F' of the third modulation is determined from the frequency FA for the positioning of the calling signals in relation to each channel of the multiplex group, from the carrier frequencies FM1 to FM12 of the second modulation and from the frequencies limiting each of the channels in the multiplex group.

When a 60 – 108 kc/s basic primary group is constituted, the frequency of the third modulation F' is:

F' = FM1 + 108 – FA = . . . = FM12 + 64 – FA = 300 (kc/s) where

FM1 = 192 kc/s . . . and FM12 = 236 kc/s.

When an 1104 – 1152 high-frequency primary group is constituted, the frequency of the third modulation F' is:

$F' = FM1 + 1152 - FA = \ldots = FM12 + 1104 - FA = 2384 - FA$ kc/s, where FM1 to FM12 are chosen as 1232 to 1280 kc/s.

In those two expressions of F', the frequency FA is also the frequency of the calling signals in relation to each of the conversation channels of the multiplex group. According to the standardized values $FA = 0$ or 3.285 kc/s.

A coupler 13 receives the spectrum as a whole coming from the channel coupler 8, 9 on a first input *a* and after modulation at 11 on a second input *b* and applies it to a band-pass filter 14 whose width is equal to the band of the primary group GP. A frequency multiplex group in which are brought together the conversation signals and the calling signals which are respectively connected with the voice frequency channels is thus constituted.

In that circuitry, the undesirable modulation products coming from the modulator 11, due to the harmonic in the order of 2, 3 . . . are easily removed by filtering at 14. None of these products is situated in the band of the multiplex group.

The advantage afforded by the emitting device according to FIGS. 1 and 2 in relation to the device according to known art resides in the omission of the twelve transmission modulators arranged on the calling channels, before coupling of the calling channels and of the conversation channels, as well as of the twelve connected filters which are here substituted by a single modulator (modulator 11) and a single filter (filter 10).

While I have shown and described two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What I claim is:

1. Multiplexer for telephone channels providing for the transposition of conversation channels and of very low frequency calling channels respectively of the same order which are connected with them, in the band of a multiplex frequency group, in which the signals coming from the calling channels have a frequency, FA, comprising, for each of the conversation channels, a first modulator followed by a filter, effecting a premodulation by a first carrier having the same frequency for all the conversation channels to constitute premodulated conversation channels; for each of the premodulated conversation channels, a second modulator effecting a modulation by a carrier, said carrier having a frequency which is shifted in 4 kc/s increments from one premodulated channel to the other according to the order of the channel, to place the conversation channels in the band of the multiplex group, characterized in that the calling channels free from premodulation are coupled directly to the premodulated conversation channels and are modulated by the second respective carriers simultaneously with the premodulated conversation signals; and further comprising a third modulator effecting a modulation by a third carrier of the spectrum as a whole, modulated by the second respective carriers and filtered, and a single band-pass filter having a pass band corresponding to the band of the multiplex group, receiving the spectrum as a whole before modulation by the said third carrier and of the spectrum as a whole after modulation by the said third carrier.

2. Multiplexer according to claim 1, characterized in that said calling channels, free from premodulation, taken in increasing order, are directly coupled to the conversation channels which are premodulated, taken in increasing order, and in that the frequency of the said third carrier is chosen equal to $F + FA$, F being the frequency of the said first carrier.

3. Multiplexer according to claim 1, characterized in that said calling channels free from premodulation, taken in decreasing order, are directly coupled to the premodulated conversation channels, taken in increasing order, and in that the frequency F' of said third carrier is defined by a respective frequency FMi of said second carriers, a respective higher frequency in the multiplex group limiting the respective channel associated with said second carrier, and said frequency FA, said frequency FMi being taken in increasing order, and said respective higher frequency being taken in decreasing order in said multiplex group.

4. Multiplexer according to claim 3, characterized in that, when a basic primary group having a band of 60 – 108 kc/s is constituted with twelve channels, said frequency F' is defined by one of the relations $F' = FM1 + 108 - FA$ or $F' = FM12 + 64 - FA$, in which FM1 and FM12 correspond to the value of FMi for the respective second carrier of the premodulated conversation channel.

5. Multiplexer according to claim 3, characterized in that, when a high-frequency primary group having a band of 1104 – 1152 kc/s is constituted with twelve channels, said frequency F' is defined by one of the relations $F' = FM1 + 108 - FA$ or $F' = FM12 + 64 - FA$, in which FM1 and FM12 correspond to the value of FMi for the respective second carrier of the premodulated conversation channel.

6. In a multi-channel transmission system for converting to a primary band group: voice signals in a voice band from a plurality of voice channels, and auxiliary signals, such as calling and supervisory signals, having a very low frequency from a plurality of auxiliary channels pertaining to the respective voice signals, a multiplexer comprising:

premodulation means for converting respective voice signals of respective voice channels into a plurality of premodulated voice channels having a same carrier frequency, means for coupling respective auxiliary channels with respective ones of said premodulated voice channels, modulation means for modulating the respective coupled channels into a plurality of modulator stages having respective carrier frequencies for converting each premodulated voice channel to the primary band group, extra modulation means for modulating the whole spectrum of said plurality of modulator stages such that modulated auxiliary channels are positioned into said primary band group, and band filtering means receiving said whole spectrum of said plurality of modulator stages from said modulation means and the modulated whole spectrum from said extra modulation means for supplying said voice signals and said auxiliary signals in said primary band group.

\* \* \* \* \*